(12) United States Patent
Park et al.

(10) Patent No.: US 6,876,404 B2
(45) Date of Patent: Apr. 5, 2005

(54) LIQUID CRYSTAL DISPLAY DEVICE AND FABRICATING METHOD THEREOF

(75) Inventors: Cheol Woo Park, Daegu (KR); Min Jic Lee, Daegu (KR)

(73) Assignee: LG. Philips LCD Co., Ltd., Seoul (KR)

(*) Notice: Subject to any disclaimer, the term of this patent is extended or adjusted under 35 U.S.C. 154(b) by 172 days.

(21) Appl. No.: 10/281,175

(22) Filed: Oct. 28, 2002

(65) Prior Publication Data

US 2003/0117535 A1 Jun. 26, 2003

(30) Foreign Application Priority Data

Dec. 20, 2001 (KR) .................................. 2001-0081771

(51) Int. Cl.$^7$ .............................................. G02F 1/136
(52) U.S. Cl. ............................. 349/38; 349/39; 257/59; 257/72
(58) Field of Search ............................. 349/38, 39, 42; 257/59, 72, 350

(56) References Cited

U.S. PATENT DOCUMENTS

| | | | |
|---|---|---|---|
| 5,523,866 A | * 6/1996 | Morimoto et al. | 349/43 |
| 5,546,207 A | 8/1996 | Kim | |
| 5,808,706 A | * 9/1998 | Bae | 349/38 |
| 5,844,641 A | * 12/1998 | Jun et al. | 349/38 |
| 6,025,892 A | * 2/2000 | Kawai et al. | 349/43 |
| 6,356,318 B1 | * 3/2002 | Kawahata | 349/38 |
| 6,403,980 B1 | * 6/2002 | Park | 257/59 |
| 2001/0046003 A1 | * 11/2001 | Song | |

FOREIGN PATENT DOCUMENTS

| | | |
|---|---|---|
| JP | 20 87667 | 3/1990 |
| JP | 2001-331126 | 11/2001 |
| KR | 2001-47907 | 6/2001 |

OTHER PUBLICATIONS

Search Report, Korean Patent Office, May 19, 2004.

* cited by examiner

Primary Examiner—Tarifur R. Chowdhury
Assistant Examiner—Thoi V. Duong
(74) Attorney, Agent, or Firm—McKenna Long & Aldridge LLP

(57) ABSTRACT

A liquid crystal display device, and its fabrication method, having reduced picture quality deterioration and shorts. A thin film transistor is provided at intersections of gate and data lines. A pixel electrode connects to the thin film transistor. A storage electrode overlaps part of a gate line and extends along data lines. That storage electrode is overlapped by part of the pixel electrode. Channels are defined between the storage electrode and the data lines. A constant gap between the pixel electrodes and the data lines prevent a deterioration of picture quality and shorts between adjacent pixel electrodes and between the storage electrode and the data lines.

22 Claims, 12 Drawing Sheets

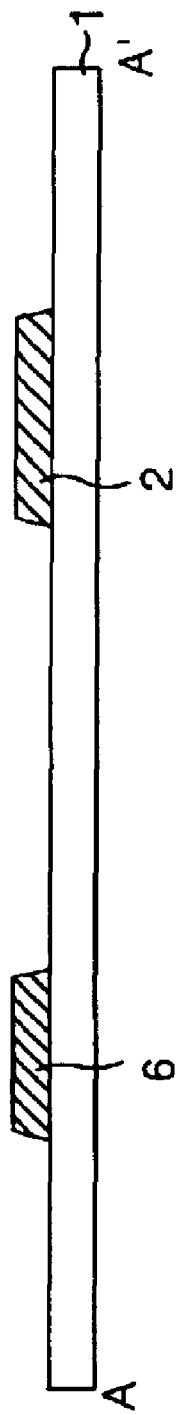
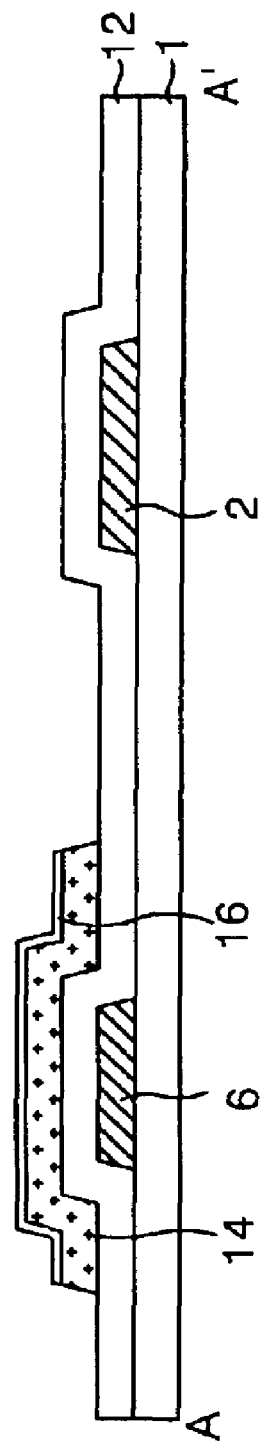

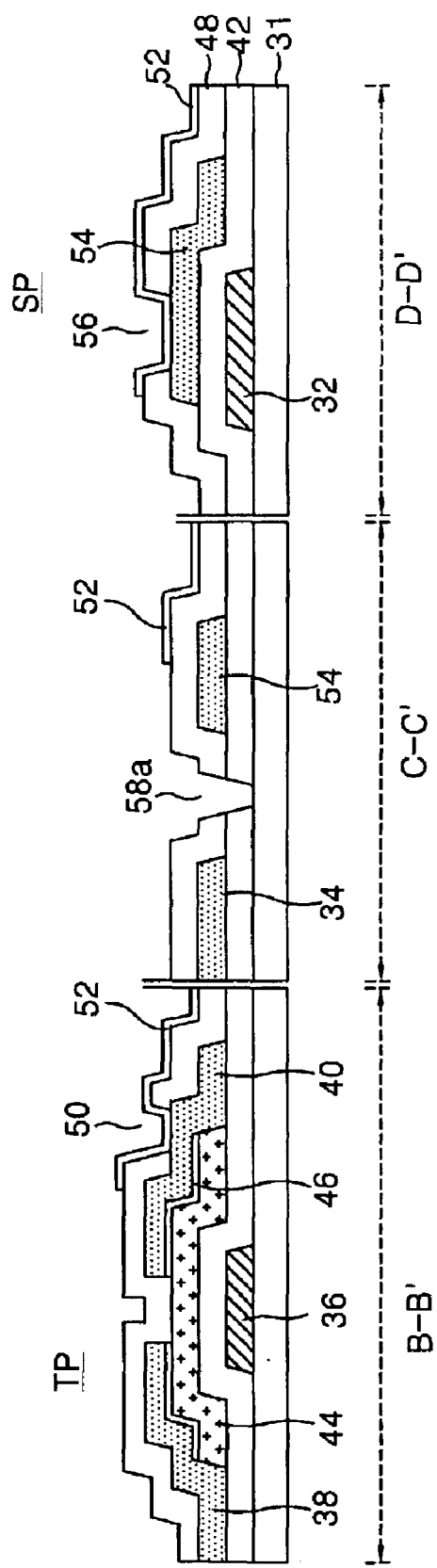

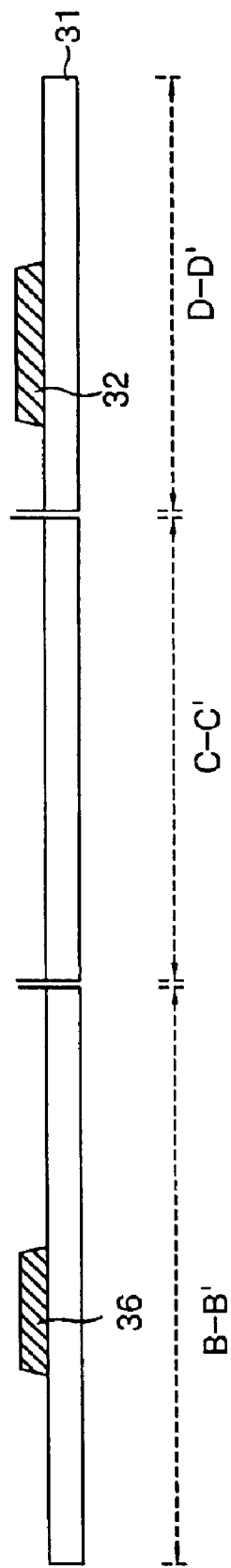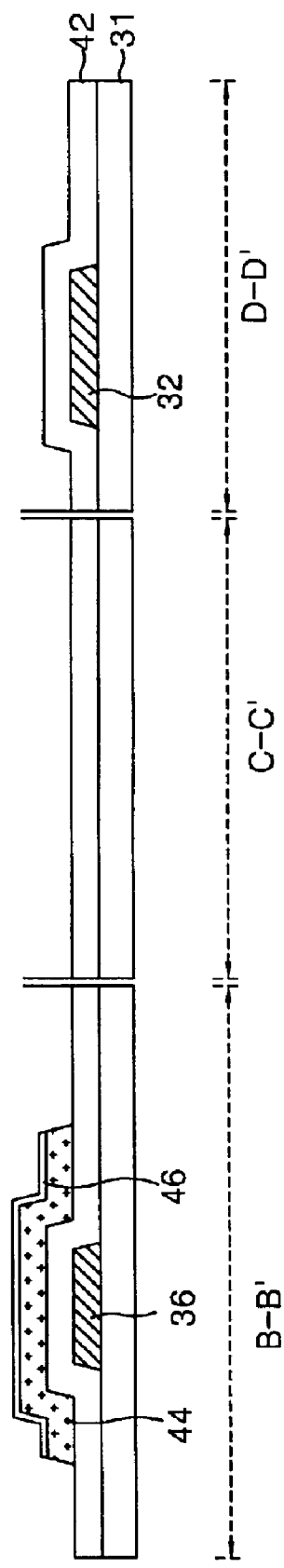

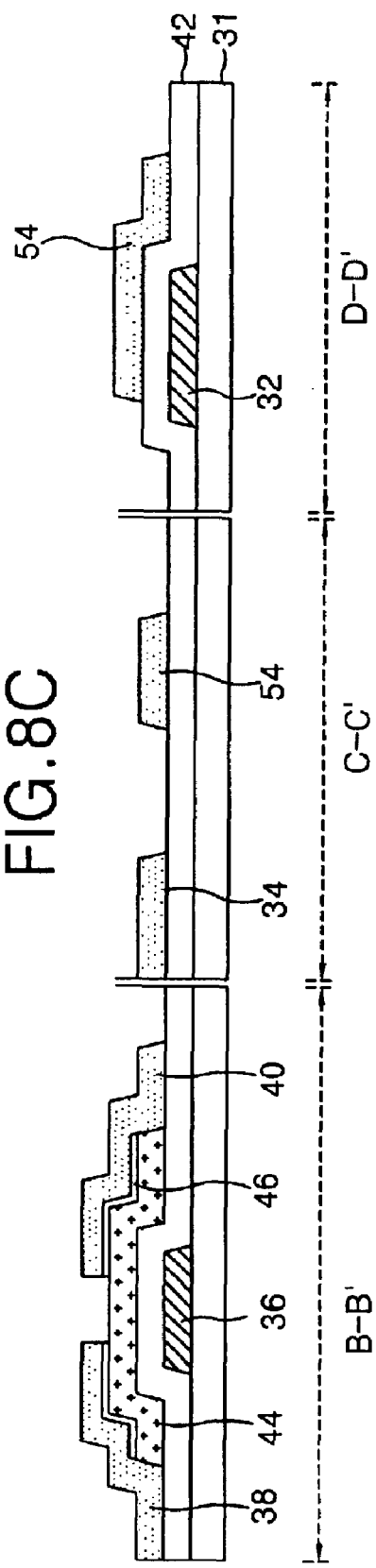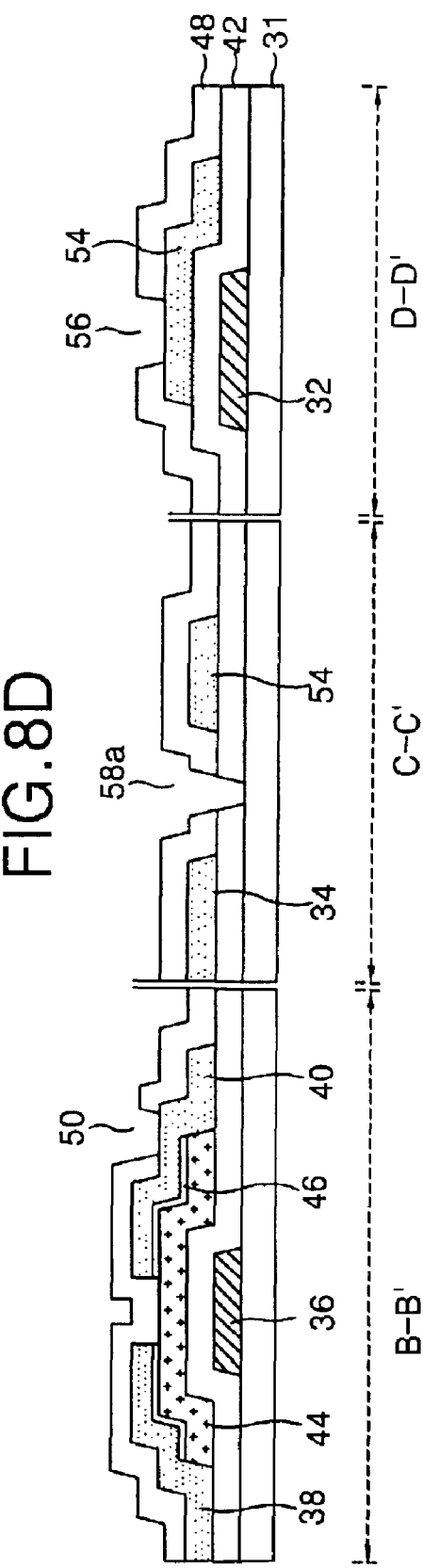

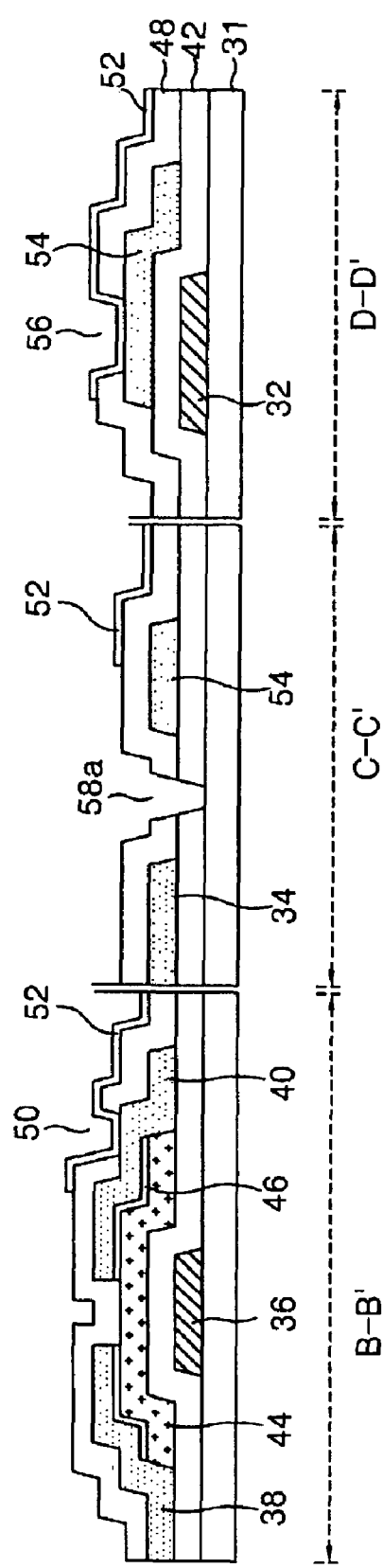

LIQUID CRYSTAL DISPLAY DEVICE AND
FABRICATING METHOD THEREOF

This application claims the benefit of Korean Patent Application No. 2001-0081771, field on Dec. 20, 2001, which is hereby incorporated by reference.

BACKGROUND OF THE INVENTION

1. Field of the Invention

This invention relates to liquid crystal displays. More particularly, it relates to preventing picture quality deterioration and shorting between adjacent pixel electrodes.

2. Description of the Related Art

A liquid crystal display (LCD) uses an electric field to control light transmittance to produce an image. An LCD includes a liquid crystal panel having a matrix of liquid crystal cells, and driving circuits for driving the liquid crystal cells. The liquid crystal panel includes a common electrode and pixel electrodes for producing electric fields in accordance with data signals. Typically, the pixel electrodes are provided on a lower substrate, whereas the common electrode is on an upper substrate. Usually, each pixel electrode is connected to a thin film transistor (TFT) that acts as a switching device.

Referring now to FIG. 1 and FIG. 2, a conventional liquid crystal display includes a lower substrate 1 having a TFT TP that is arranged at an intersection between a data line 4 and a gate line 2. A pixel electrode 22 is connected to a drain electrode 10 of the TFT. A storage capacitor SP is formed by overlapping a portion of the pixel electrode 22 and a gate line 2.

The TFT TP includes a gate electrode 6 that is connected to the gate line 2, a source electrode 8 that is connected to the data line 4, and the drain electrode 10 that is connected, via a drain contact hole 20, to the pixel electrode 22. Further, the TFT TP includes semiconductor layers 14 and 16 for defining a channel between the source electrode 8 and the drain electrode 10 when a gate voltage is applied to the gate electrode 6. Such a TFT TP responds to gate signals from the gate line 2 to selectively apply data signals from the data line 4 to the pixel electrode 22.

The pixel electrodes 22 are positioned in liquid crystal cell areas that are defined by the data lines 4 and the gate lines 2. The pixel electrodes 22 are made from a transparent conductive material having a high light transmittance. Each pixel electrode 22 forms a potential difference with a common transparent electrode (not shown) on an upper substrate. The potential differences are controlled by data signals applied via the drain contact holes 20. The potential differences cause a liquid crystal that is disposed between the lower substrate 1 and the upper substrate to rotated due to dielectric anisotropy. Thus, the liquid crystal selectively enables light from a light source to be transmitted into the upper substrate.

The storage capacitors SP restrain voltage variations on the pixel electrodes 22. Each storage capacitor SP is comprised of a gate line 2, a storage electrode 24 that overlaps the gate line 2, and a gate insulating film 12 that is disposed between the gate line 2 and the storage electrode 24. Each storage electrode 24 is electrically connected, via a storage contact hole 26 defined on a protective film 18, to a pixel electrode 22.

Hereinafter, a method of fabricating the lower substrate 1 of the liquid crystal display having the above-mentioned configuration will be described with reference to FIG. 3A through FIG. 3E. First, a gate metal layer is deposited on the lower substrate 1. That metal layer is then patterned to form the gate line 2 and the gate electrode 6.

Referring now to FIG. 3B, a gate insulating film 12 is then deposited over the lower substrate 1, over the gate line 2, and over the gate electrode 6. First and second semiconductor layers are then sequentially deposited on the gate insulating film 12. Those semiconductor layers are patterned to form an active layer 14 and an ohmic contact layer 16.

Referring now to FIG. 3C, a data metal layer is then deposited and patterned to form the storage electrode 24, the source electrode 8, and the drain electrode 10. Thereafter, as shown in FIG. 3D, a protective film 18 is deposited and patterned to define a drain contact hole 20 and a storage contact hole 26. Then, as shown in FIG. 3E, a transparent conductive material is deposited to form a pixel electrode 22 that extends into the drain contact hole 20 and into the storage contact hole 26.

In the illustrated LCD, the protective film 18 is usually made from an inorganic material having a large dielectric constant, typically silicon nitride $SiN_x$ and/or silicon oxide $SiO_x$. Referring now back to FIG. 1, the pixel electrode 22 and the data line 4 should be separated by a certain horizontal gap x, for example, 3 to 5 $\mu$m. This minimizes coupling caused by a parasitic capacitor. However, if a misalignment occurs when forming the pixel electrode 22, the gap between the data lines 4 is not even on the left and right sides. This causes non-uniformity of the parasitic capacitances between the data lines 4 and the pixel electrodes 22. This can cause data signal deterioration, which results in degraded picture quality.

Furthermore, referring now to FIG. 4, when a transparent conductive material 22a is patterned to provide the pixel electrode 22, a portion of the transparent conductive material 22a may remain in exposed areas. Thus, there is possibility that a short-circuit may occur between adjacent pixel electrodes 22.

SUMMARY OF THE INVENTION

Accordingly, it is an object of the present invention to provide a liquid crystal display, and a fabricating method thereof, having features that reduce picture quality degradation and/or short-circuiting between adjacent pixel electrodes.

To achieve these and other objects of the invention, a liquid crystal display device according to one aspect of the present invention includes a thin film transistor near an intersection of a data line and a gate line; a pixel electrode that is connected to the thin film transistor; a storage electrode that overlaps part of the gate line and that extends along the data line at a predetermined distance from the data line; and a channel through an insulation layer, with the channel being located between the storage electrode and the data line and extending along the data line.

In the liquid crystal display device, the storage electrode beneficially has an inverse "U" shape. Furthermore, the distance between the storage electrode and the data line should be more than 4 $\mu$m. Additionally, the channel should have a width less than 3 $\mu$m.

The thin film transistor includes a gate electrode that is connected to the gate line; a semiconductor layer on a gate insulating film; a source electrode that is connected to the data line; and a drain electrode that is connected to the pixel electrode.

The liquid crystal display device beneficially further includes a gate insulating film between the gate line and the storage electrode, and a protective film that covers the thin film transistor, the data line, and the storage electrode. Then, the channel passes through the protective film and the gate insulating film. Additionally, the storage electrode and the drain electrode are in contact with the pixel electrode via a storage contact hole and via a drain contact hole, both of which pass through the protective film.

A method of fabricating a liquid crystal display device according to another aspect of the present invention includes forming gate lines on a substrate; forming a gate insulating film on the substrate and gate lines; forming data lines on the gate insulating film that cross the gate lines and, at the same time, forming storage electrodes that overlap parts of the gate lines. The method further includes forming a protective film on the gate insulating film; defining elongated channels through the protective film and through the gate insulating film such that the channels are located between the storage electrodes and the data lines and such that the channels extend along the data lines. Then, forming pixel electrodes on the protective film such that the pixel electrodes contact the storage electrodes. The method further includes forming gate electrodes on the substrate under the gate insulating film; forming semiconductor layers on the gate insulating film and over the gate electrodes; forming source electrodes and drain electrodes on the gate insulating film and on the semiconductor layers; and forming drain contact holes through the protective film to expose the drain electrode. Beneficially, the pixel electrodes connect to the drain electrodes through the drain contact holes.

Beneficially, the data lines are more than 4 μm from the storage electroded. Furthermore, the channel beneficially has a width less than 3 μm.

BRIEF DESCRIPTION OF THE DRAWINGS

These and other objects of the invention will be apparent from the following detailed description of the embodiments of the present invention and with reference to the accompanying drawings, in which:

FIG. 3A to FIG. 3E are sectional views that illustrate the fabrication of the lower substrate shown in FIG. 2;

FIG. 6 is a sectional view of the lower substrate of FIG. 5 taken along lines B–B', C–C' and D–D';

FIG. 8A to FIG. 8E are sectional views illustrating the fabrication of the lower substrate shown in FIG. 6.

DETAILED DESCRIPTION OF THE PREFERRED EMBODIMENT

Figure 1:
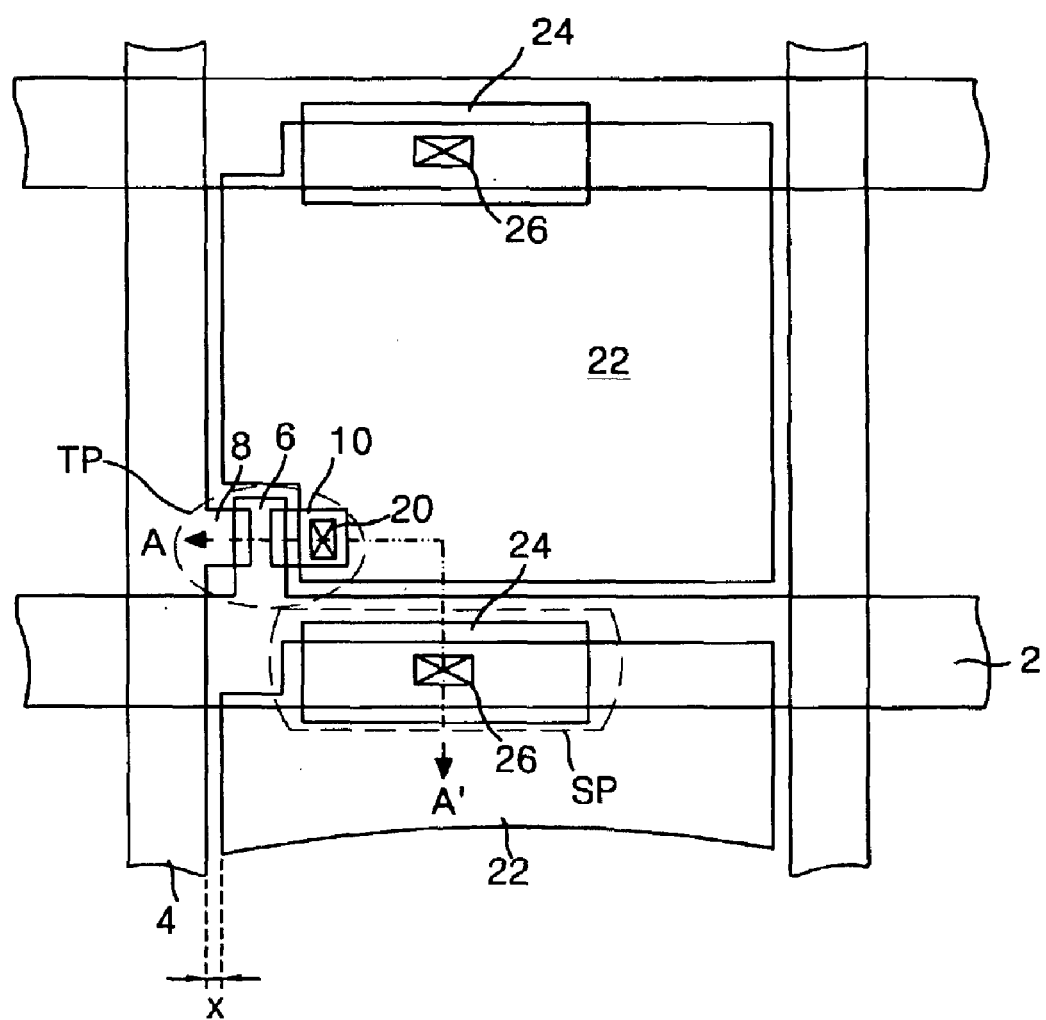
FIG. 1 is a plan view showing a lower substrate of a conventional liquid crystal display.
Figure 2:
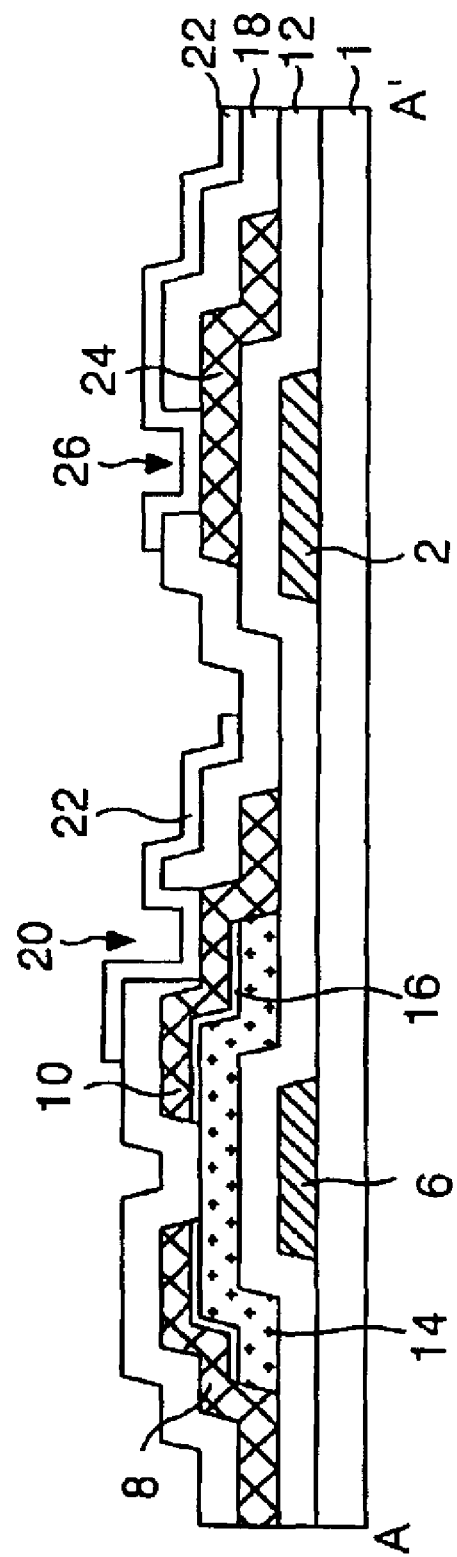
FIG. 2 is a sectional view of the lower substrate of FIG. 1 taken along line A–A'.
Figure 3C:
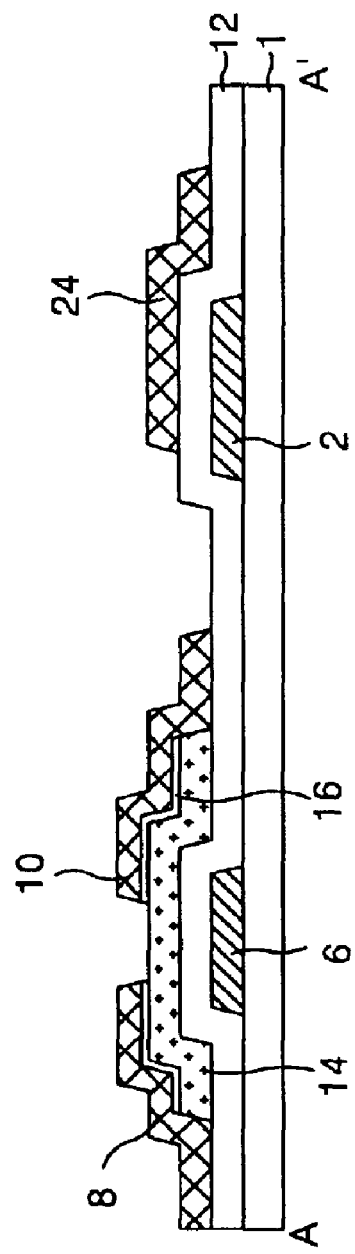
Figure 3D:
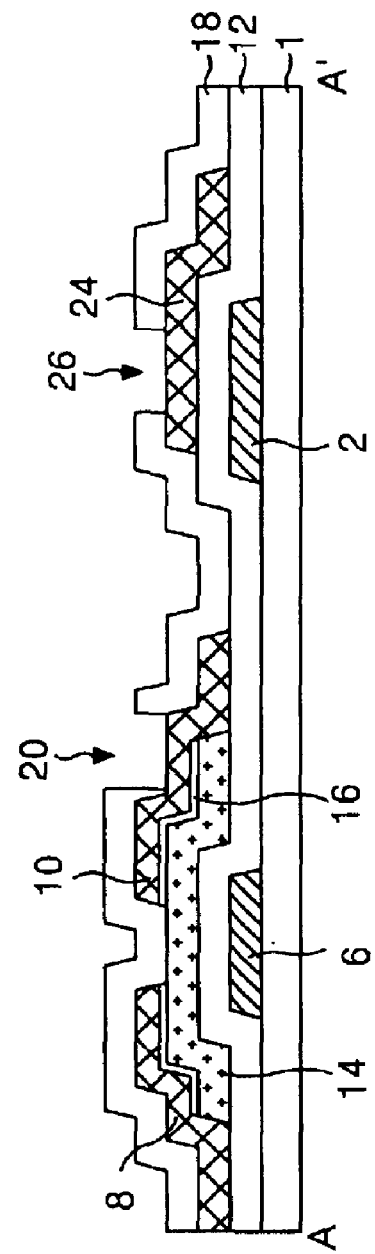
Figure 3E:
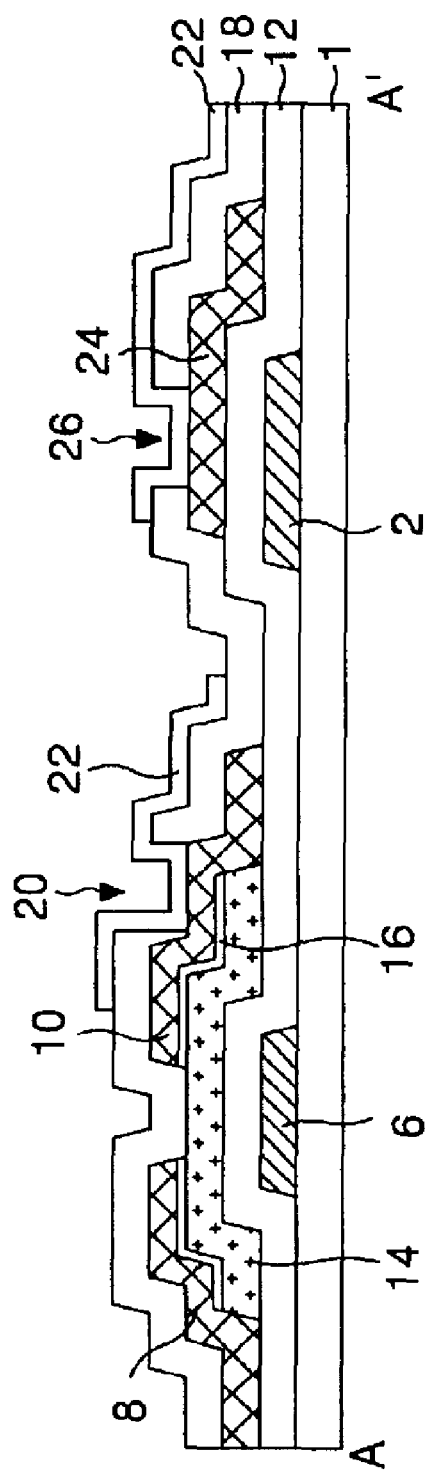
Figure 4:
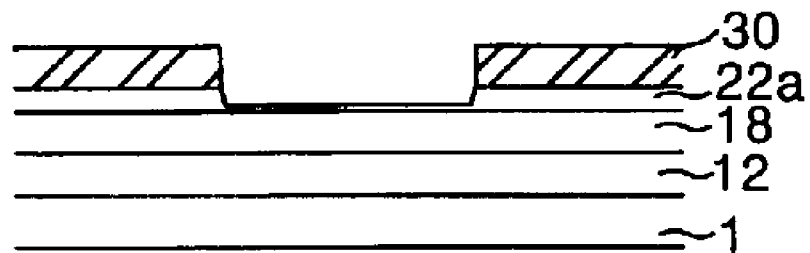
FIG. 4 illustrates a pattern defect of the type found in the lower substrate of FIG. 2.
Figure 5:
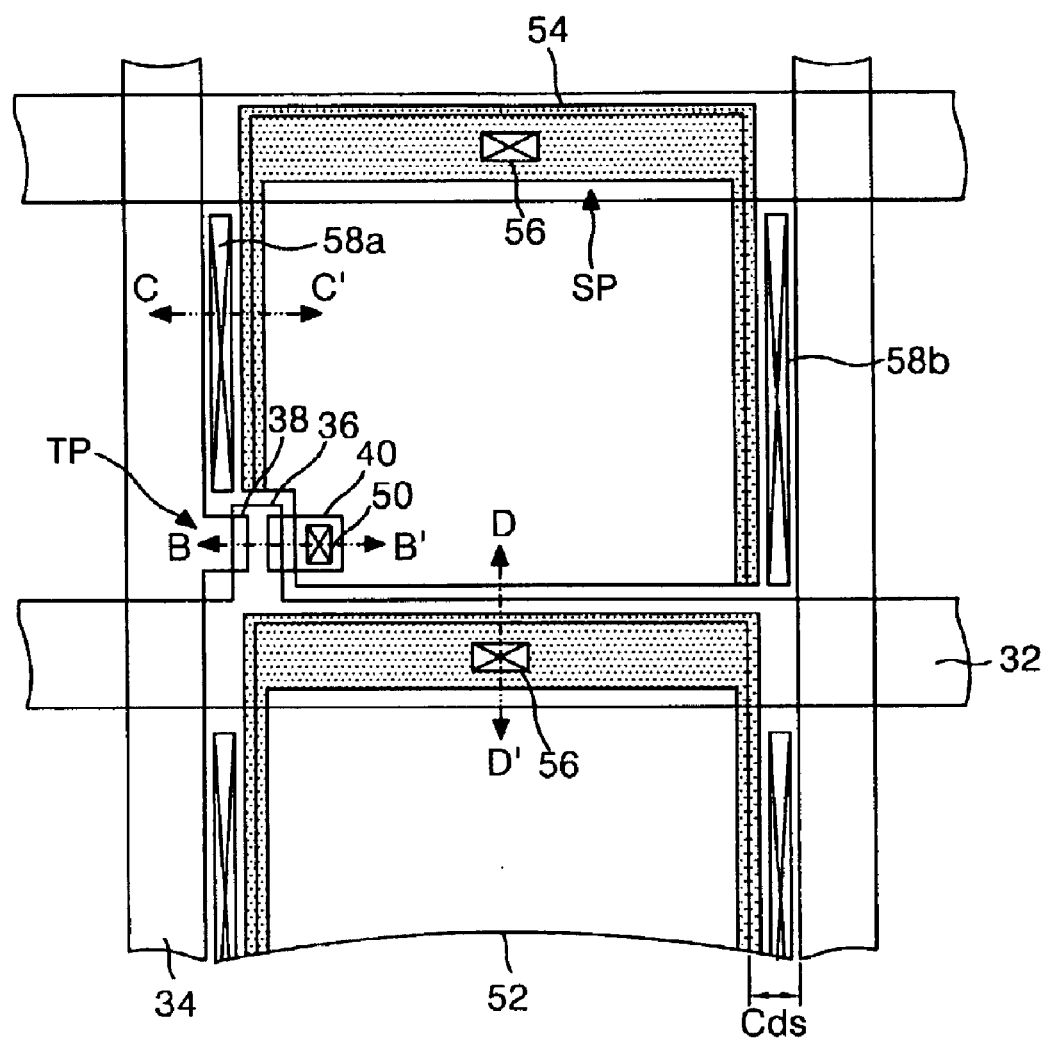
FIG. 5 is a plan view showing a lower substrate of a liquid crystal display according to an embodiment of the present invention.

FIG. 5 and FIG. 6 illustrate a lower substrate of a liquid crystal display according to an embodiment of the present invention. Referring to FIG. 5 and FIG. 6, the lower substrate 31 of the liquid crystal display (LCD) includes a TFT TP at an intersection between a data line 34 and a gate line 32, a pixel electrode 52 that is connected to a drain electrode 40 of the TFT TP, and a storage capacitor SP that is positioned over part of a gate line 32.

The TFT TP includes a gate electrode 36 that is connected to the gate line 32, a source electrode 38 that is connected to the data line 34, and a drain electrode 40 that is connected, via a drain contact hole 50, to the pixel electrode 52. Further, the TFT TP includes semiconductor layers 44 and 46 that define a conductive channel between the source electrode 38 and the drain electrode 40 when a gate voltage is applied to the gate electrode 36. The TFT TP thus responds to gate signals on the gate line 32 to selectively apply data signals from the data line 34 to the pixel electrode 52.

The pixel electrode 52 is positioned at a cell area defined by the data lines 34 and the gate lines 32. The pixel electrode is comprised of a transparent conductive material having a high light transmittance. The pixel electrode 52 applies a potential difference between its own voltage (being that of a data signal) and a common transparent electrode (not shown) on an upper substrate (also not shown). This potential difference controls the dielectric anisotropy of a liquid crystal that is disposed between the lower substrate 31 and the upper substrate (not shown). Thus, the liquid crystal controls the light from a light source that passes through the upper substrate.

The storage capacitor SP restrains voltage variations in the pixel electrode 52. The storage capacitor SP is comprised of part of the gate line 32, a storage electrode 54 that overlaps the gate line 32, and a gate insulating film 42 between the gate line 32 and the storage electrode 54. The storage electrode 54 is electrically connected, via a storage contact hole 56 through a protective film 48, to the pixel electrode 52.

The storage electrode 54 is on the gate insulating film and is overlapped by part of the pixel electrode 52. Additionally, the storage electrode 54 extends along right and left data lines 34. The storage electrode 54 is spaced a predetermined distance, beneficially more than 4 μm, from those data lines 34. As shown in FIG. 5, the storage electrode 54 has as an inverted 'U' shape that encompasses most of the pixel electrode 52. The storage electrode 54 is larger than conventional storage electrodes and has increased capacitance.

Accordingly, the distance between the left and right data lines 34 and the pixel electrode 52 is substantially constant because of the gap between the storage electrode 54 (which is partially overlapped by the pixel electrode 52) and the data line 34. Due to the constant separation between the data line 34 and the pixel electrode 52, the capacitance between the pixel electrode 52 and the data line 34 is constant. This reduces picture quality deterioration caused by data signal fluctuations on the pixel electrode 52.

Still referring to FIG. 5 and FIG. 6, first and second channels 58a and 58b between the storage electrode 54 and the right and left data lines 34 pass through the protective film 48 and through the gate insulating film 42. The first and second channels 58a and 58b, which extend along the data lines 34, should have a width of less than about 3 μm. Forming the first and second channels 58a and 58b reduce shorting between the storage electrode 54 and the data line 34 caused by pattern defects.

Figure 7A:
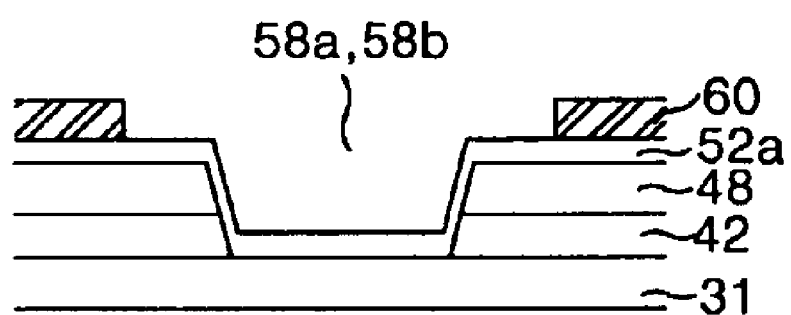
FIG. 7A and FIG. 7B are sectional views illustrating short-circuit prevention between adjacent pixel electrodes.
Figure 7B:
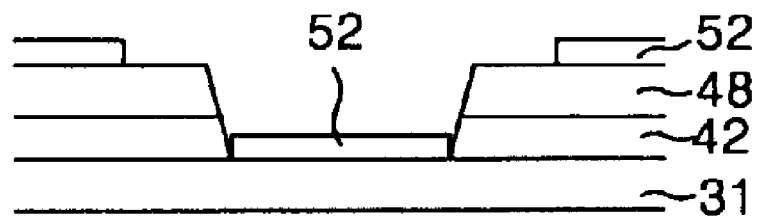

Also, by forming the first and second channels 58a and 58b, shorting between adjacent pixel electrodes is also prevented Referring now to FIG. 7A, when depositing the transparent conductive material 52a that forms the pixel electrode 52, only a relatively thin deposition is produced on inclined portions of the first and second channels 58a and 58b. Thus, the transparent conductive material 52a on the inclined portions has a relatively low etching depth. Referring now to FIG. 7B, after forming the photo-resist pattern 60 (shown in FIG. 7A) that protects areas that are not to be etched, wet etching of the exposed transparent conductive material 52a rapidly removes the transparent conductive material 52a from the inclined portions. Accordingly, shorting between adjacent pixel electrodes 52 can be prevented.

FIG. 8A to FIG. 8E help illustrate the fabrication of the LCD elements shown in FIG. 6. Referring to FIG. 8A, the gate line 32 and the gate electrode 36 are formed on the lower substrate 31 of the LCD by depositing and etching a gate metal layer. A suitable deposition technique is sputtering. The gate metal layer is beneficially comprised of aluminum (Al) or of an aluminum alloy. Patterning is beneficially performed by photolithographic techniques and etching.

Referring to FIG. 8B, a gate insulating film 42, an active layer 44, and an ohmic contact layer 46 are then formed. As shown, the gate insulating film 42 covers the lower substrate 31, the gate line 32, and the gate electrode 36. The active layer 44 and the ohmic contact layer 46 are on the gate insulating film 42 over the gate electrode 36. The gate insulating film 42 is beneficially comprised of an inorganic insulating material such as silicon oxide ($SiO_x$) or silicon nitride ($SiN_x$). Thereafter, first and second semiconductor layers are successively deposited onto the gate insulating film 42 by chemical vapor deposition (CVD). The first semiconductor layer is formed from undoped amorphous silicon, while the second semiconductor layer is formed from doped amorphous silicon. Subsequently, the first and second semiconductor layers are patterned by photolithography and etching to produce the active layer 44 and the ohmic contact layer 46.

Referring now to FIG. 8C, the storage electrode 54, the data line 34, the source electrode 38, and the drain electrode 40 are formed. To do so, a data metal layer is deposited over the entire structure using a deposition technique such as CVD or sputtering technique. The data metal layer is beneficially made from chrome (Cr) or molybdenum (Mo). Then, the data metal layer is patterned by photolithography and a wet etching process to form the storage electrode 54, the data line 34, the source electrode 38, and the drain electrode 40. Subsequently a portion of the ohmic contact layer 46 between the source electrode 38 and the drain electrode 40 is removed by a dry etch process to isolate the source electrode 38 from the drain electrode 40. The active layer 44 selectively forms a conductive channel between the source and drain electrodes 38 and 40.

Referring to FIG. 8D, the protective layer 48 having including the drain contact hole 50, the first and second channels 58a and 58b, and the storage contact hole 56 is then provided. To this end, an insulating material is deposited over the entire structure shown in FIG. 8C. Beneficially, the insulating material is an organic insulating material such as an acrylic organic compound, benzocyclobutene (BCB) or perfluorocyclobutane (PFCB), or an inorganic insulating material such as silicon oxide ($SiO_x$) or silicon nitride ($SiN_x$). The protective film 48 is patterned using photolithography and an etch process to form the storage contact hole 56, the drain contact hole 50, and the first and second channels 58a and 58b.

The storage contact hole 56 passes through the protective film 48 to expose a portion of the storage electrode 54. The drain contact hole 50 passes through the protective film 48 to expose a portion of the drain electrode 40. The first and second channels 58a and 58b pass through the protective film 48 and the gate insulating film 48 to expose a portion of the lower substrate 31. The first and second channels 58a and 58b prevent short-circuiting between adjacent pixel electrodes 52 and short-circuiting between the storage electrode 54 and the data lines 34.

Referring to FIG. 8E, the pixel electrode 52 is provided on the protective film 48. To this end, a transparent electrode layer is formed on the structure shown in FIG. 8D using a deposition method such as sputtering. The transparent electrode layer is beneficially made from indium-tin-oxide (ITO), indium-zinc-oxide (IZO), or indium-tin-zinc-oxide (ITZO). Then, the transparent electrode layer is patterned by photolithography and etching to form the pixel electrode 52. The pixel electrode 52 is connected via the drain contact hole 50 to the drain electrode 40. The pixel electrode 52 is connected via the storage contact hole 56 to the storage electrode 54.

As described, the storage electrode 54 overlaps part of the gate line and is overlapped by part of the pixel electrode. Additionally, the storage electrode extends along part of the data line. Accordingly, the constant horizontal gap between the pixel electrode and the data prevents or reduces picture quality deterioration. Furthermore, the channels between the storage electrode and the data line prevent shorts between adjacent pixel electrodes and between the storage electrode and the data line.

Although the present invention has been explained by reference to the embodiments shown in the drawings and described above, it should be understood that the invention is not limited to those embodiments, but rather that various changes or modifications are possible without departing from the spirit of the invention. Accordingly, the scope of the invention shall be determined only by the appended claims and their equivalents.

What is claimed is:

1. A liquid crystal display device, comprising:
    a thin film transistor provided at an intersection between a first data line and a gate line;
    a pixel electrode connected to the thin film transistor to drive a liquid crystal cell;
    a storage electrode in contact with the pixel electrode, the storage electrode extending under a portion of the pixel electrode and extending in a spaced apart relationship with the first data line, extending in a spaced apart relationship with a second data line diposed on the opposite side of the pixel electrode relative to the first data line, and extending along the gate line; and
    a channel between the storage electrode and the data line, wherein the storage electrode is electrically connected to the pixel electrode.

2. The liquid crystal display device as claimed in claim 1, wherein the storage electrode has an inverse 'U' shape.

3. The liquid crystal display device as claimed in claim 1, wherein the storage electrode has a 'U' shape.

4. The liquid crystal display device as claimed in claim 1, wherein the storage electrode and the first data line are more than 4 $\mu$m apart.

5. The liquid crystal display device as claimed in claim 1, wherein the channel width is less than 3 $\mu$m.

6. The liquid crystal display device as claimed in claim 1, wherein said thin film transistor includes:
    a gate electrode connected to the gate line;
    a semiconductor layer on a gate insulating film;
    a source electrode connected to the first data line; and
    a drain electrode connected to the pixel electrode.

7. The liquid crystal display device as claimed in claim 1, further comprising:
    a gate insulating film between the gate line and the storage electrode; and a protective film covering the thin film transistor, the first data line, and the storage electrode.

8. The liquid crystal display device as claimed in claim 7, wherein the storage electrode is in contact with the pixel electrode via a storage contact hole through the protective film, and wherein the drain electrode is in contact with the pixel electrode via a drain contact hole through the protective film.

9. The method as claimed in claim 7, wherein the gate insulating film comprises silicon oxide ($SiO_x$).

10. The method as claimed in claim 7, wherein the protective film comprises an organic insulating material.

11. The liquid crystal display device as claimed in claim 7, wherein said channel passes through both the protective film and the gate insulating film.

12. The liquid crystal display device as claimed in claim 1, wherein the channel is narrower at the bottom.

13. The liquid crystal device as claimed in claim 1, wherein the storage electrode at least partially overlaps the gate line.

14. A method of fabricating a liquid crystal display device, comprising the steps of:

fanning a gate line on a substrate;

forming a gate insulating film on the substrate and over the gate line;

forming first and second data lines and a storage electrode on the gate insulating film, wherein the storage electrode has a first portion that is spaced apart from and extends along the first data line, a second portion that is spaced apart from and extends along the second data line, and a third portion that extends along the gate line, wherein the first, second, and third portions are in contact with each other;

forming a protective film on the gate insulating film, on the storage electrode, on the gate line, and on the first and second data lines;

defining a first channel between the first portion of the storage electrode and the first data line, and a second channel between the second portion of the storage electrode and the second data line, wherein the first and second channels extend through the protective film and through the gate insulating film; and forming a pixel electrode on the protective film, wherein the pixel electrode is connected to the storage electrode via a storage contact hole through the protective film.

15. The method as claimed in claim 7, further comprising the steps of:

forming a gate electrode on the substrate;

covering the gate electrode with the gate insulating film;

forming a semiconductor layer on the gate insulating film and over the gate electrode;

forming a source electrode and a drain electrode on the gate insulating film and the semiconductor layer;

forming the protective film on the drain electrode; and forming a drain contact hole through the protective film to expose the drain electrode.

16. The method as claimed in claim 15, wherein the first data line is spaced more than 41 $\mu$m from the first portion of the storage electrode.

17. The method as claimed in claim 14, wherein the first and second channels include a width of less than 3 $\mu$m.

18. The method as claimed in claim 14, wherein the first and second channels are formed with a bottom that is narrower than the top.

19. The method as claimed in claim 18, wherein the first and second channels are etched.

20. The method as claimed in claim 18, wherein the step of forming a pixel electrode on the protective film includes the steps of:

depositing a transparent conductive film over the protective film and in the first and second channels;

masking the transparent conductive film to define a pixel area, wherein the transparent conductive film in the first and second channels is not masked; and etching the transparent conductive film to define a pixel electrode such that the transparent conductive film in the first and second channels is etched.

21. The method as claimed in claim 20, wherein the deposited conductive film is ITO.

22. A liquid crystal display device, comprising:

a gate line on a substrate;

a gate insulating film on the substrate and over the gate line;

first and second data lines and a storage electrode on the gate insulating film, wherein the storage electrode has a first portion that is spaced apart from and extends along the first data line, a second portion that is spaced apart from and extends along the second data line, and a third portion that extends along the gate line, wherein the first, second, and third portions are in contact with each other;

protective film on the gate insulating film, on the storage electrode, on the gate line, and on the first and second data lines;

a first channel between the first portion of the storage electrode and the first data line, and a second channel between the second portion of the storage electrode and the second data line, wherein the first and second channels extend through the protective film and through the gate insulating film, and a pixel electrode on the protective film, wherein the pixel electrode is connected to the storage electrode via a storage contact hole through the protective film.

* * * * *